Figure 1:
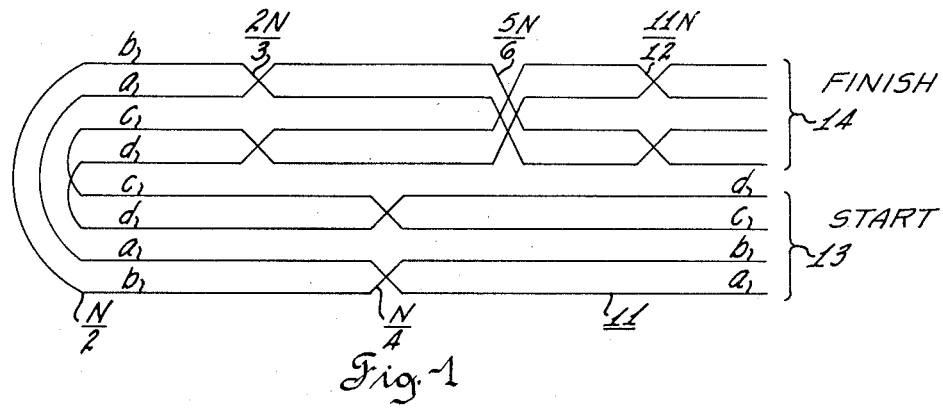

Dec. 1, 1964     H. F. VOGEL     3,159,804

WINDING TRANSPOSITION

Filed April 25, 1961

Inventor
Herbert F. Vogel
by Houston L. Swenson
Attorney

United States Patent Office 3,159,804
Patented Dec. 1, 1964

3,159,804
WINDING TRANSPOSITION
Herbert F. Vogel, Terre Haute, Ind., assignor to Allis-Chalmers Manufacturing Company, Milwaukee, Wis.
Filed Apr. 25, 1961, Ser. No. 105,415
4 Claims. (Cl. 336—187)

This invention relates to windings for electrical apparatus and in particular to the transposition of windings wound in two layers parallel to the direction of leakage flux, with four conductors deep, perpendicular to direction of leakage flux.

It has been well recognized that in windings designed to carry heavy currents the magnetic fields generate losses which, without special precautions being taken, are substantially higher than those obtained under the assumption of uniform current distribution in the active copper. The difference is commonly referred to as stray loss.

In order to obtain minimum stray losses, it has been recognized, also, that it is necessary to strand the conductors, which means that several conductor strands are connected in parallel in each turn. If the location of each strand changes from layer to layer in such a way that each strand is linked with the same amount of flux, and hence has the same induced electromotive force, such a winding is usually referred to as having a complete transposition.

An incomplete transposition is then one, that introduces an additional stray current component. These additional currents have a uniform density throughout the cross section in each strand. The sum of these currents is zero in each turn, so that they must flow back and forth through the different strands. Therefore, the additional stray current component is referred to as circulating current.

Hence, considering the stray losses, any number of strands may be arranged parallel to the leakage flux, as long as they all occupy the same position perpendicular to the direction of the leakage flux. Any such group of strands arranged parallel to the direction of the leakage flux, thus occupying the same position perpendicular to direction of leakage flux, is usually referred to as a conductor.

With respect to two and three conductor windings, the question of proper transposition is not difficult to solve. However, for higher current carrying windings requiring more conductors, the matter of transposition becomes more complex. One manner for obtaining a transposition in which four conductor strands have equal flux linkage is to arrange each conductor so that it occupies a series of positions identical to the positions of the other three conductors for equal lengths. While this may be adequate for a one layer winding, it becomes a rather difficult construction when one wishes to manufacture a winding having two layers parallel to the leakage flux. In such a winding there are eight positions perpendicular to direction of leakage flux and consequently each of the four conductor strands would have to assume all eight positions over equal lengths.

This invention overcomes the disadvantages of the above type arrangement through the use of 180° transpositions in which the sequence of positions perpendicular to direction of leakage flux is reversed among the respective conductors. In this manner the number of transpositions required for a two layer winding with four conductors deep, perpendicular to direction of leakage flux, is appreciably reduced, thereby providing simpler construction.

It is therefore one object of this invention to provide for a new and improved 180° transposed four conductor deep winding.

Another object is to provide for a new and improved four conductor deep two layer winding with substantially equal flux linkage for all conductors.

Figure 2:
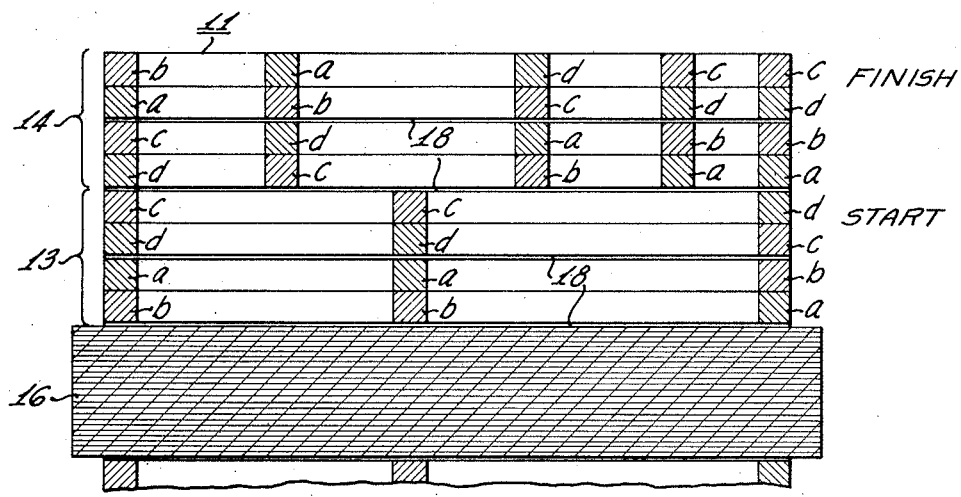

Objects and advantages other than those mentioned above will be apparent from the following description taken in connection with the accompanying drawing in which:

FIG. 1 indicates diagrammatically how a winding having four conductors and two layers may be transposed in accordance with this invention; and FIG. 2 is a view on a longitudinal plane taken radially through a transformer having the type of transposition shown in FIG. 1.

With reference to FIGS. 1 and 2, a cylindrically wound winding 11 having an inner layer 13 and an outer layer 14 of the four parallel connected conductors $a$, $b$, $c$, and $d$ is shown inductively linked with a core 16. Cooling barriers 18 for providing ducts may be disposed between each pair of conductors $a$, $b$, and $c$, $d$ and the core 16 for increased heat dissipation. It is to be noted that there are four transposition points within the two layers 13 and 14 and a fifth transposition point between the first and second layers. The winding has a total number of N turns with conductors $a$ and $b$ comprising the first pair of wires and conductors $c$ and $d$ comprising the second pair of wires. The conductors in each pair are transposed 180° at transposition point N/4. For an even numbered group of conductors a 180° transposition is one in which each conductor interchanges its height position relative to the winding's axis with another conductor. For an odd numbered group the above applies with the exception that only one conductor maintains its same height position. A 180° group transposition is defined as one in which all of the groups interchange their height positions. At point N/2 or the midway point between the first and second layers, the first and second pairs of conductors are group transposed 180° with respect to each other and in addition the two conductors $a$ and $b$ are transposed 180°. The next point of transposition occurs at the point 2N/3 where the two conductors $a$ and $b$ in the first pair and the two conductors $c$ and $d$ in the second pair are transposed. At point 5N/6, the first and second pairs of conductors are group transposed with respect to each other and at point 11N/12, a transposition of the two conductors in each pair similar to the transposition at N/4 and 2N/3 occurs.

An algebraic examination of this transposition arrangement reveals that there is equal flux linkage between the four conductors. It is to be noted that this has been accomplished through the provision of 180° transpositions of the two pairs and the two conductors in each pair at various points in the winding. Equal summation of the current in each conductor is obtained by arranging each conductor into several positions totaling less than the number of available positions. Consequently, the total number of transpositions required for the winding is less.

Although only one embodiment of this invention has been illustrated and described, it will be apparent to those skilled in the art that various changes and modifications may be made therein without departing from the spirit of the invention or the scope of the appended claims.

What is claimed is:

1. A cylindrically wound electrical winding for an induction apparatus, said winding having N number of turns and comprising an inside layer and an outside layer, each layer having first and second pairs of conductors, said winding having 180° pair transpositions at N/2 turns and also in said outside layer.

2. A cylindrically wound electrical winding for an induction apparatus, said winding having N number of turns and comprising two layers of first and second pairs of conductors, said winding having transpositions at N/4 turns, N/2 turns, 2N/3 turns, 5N/6 turns and 11N/12 turns, said transpositions providing equal flux linkage between said conductors.

3. A cylindrically wound electrical winding for an induction apparatus, said winding having N number of turns and comprising two equal layers of four conductors, said conductors being transposed at N/4 turns, N/2 turns, 2N/3 turns, 5N/6 turns, and 11N/12 turns, each of said conductors assuming less than all of the height positions of said winding, said transpositions providing equal flux linkage between said conductors.

4. A cylindrically wound electrical winding for an induction apparatus, said winding having N number of turns and comprising two layers of first and second pairs of conductors, said pairs of conductors transposed 180° at N/2 turns and 5N/6 turns, the conductors in each said pair transposed 180° at N/4 turns, 2N/3 and 11N/12 and the conductors in said first pair originating adjacent the core of said apparatus transposed at N/2 turns.

References Cited in the file of this patent

UNITED STATES PATENTS

| | | |
|---|---|---|
| 1,629,462 | Palueff | May 17, 1927 |
| 1,834,114 | Wiggins | Dec. 1, 1931 |
| 2,710,380 | De Buda | June 7, 1955 |
| 3,023,386 | Wentz et al. | Feb. 27, 1962 |